(12) United States Patent
Padmanabhan et al.

(10) Patent No.: US 11,108,914 B2
(45) Date of Patent: Aug. 31, 2021

(54) METHOD AND SYSTEM FOR REVENUE MAXIMIZATION IN A COMMUNICATION NETWORK

(71) Applicant: SUBEX LIMITED, Bangalore (IN)

(72) Inventors: Vinod Kumar Padmanabhan, Bangalore (IN); Kiran Zachariah Pulikunnel, Bangalore (IN)

(73) Assignee: SUBEX LIMITED, Bangalore (IN)

( * ) Notice: Subject to any disclaimer, the term of this patent is extended or adjusted under 35 U.S.C. 154(b) by 0 days.

(21) Appl. No.: 17/016,152

(22) Filed: Sep. 9, 2020

(65) Prior Publication Data

US 2020/0412879 A1    Dec. 31, 2020

Related U.S. Application Data

(63) Continuation-in-part of application No. 15/429,202, filed on Feb. 10, 2017, which is a continuation of
(Continued)

(30) Foreign Application Priority Data

Oct. 21, 2013   (IN) .............................. 721/CHE/2013

(51) Int. Cl.
*H04M 15/00* (2006.01)
*H04M 15/28* (2006.01)
(Continued)

(52) U.S. Cl.
CPC .......... *H04M 15/43* (2013.01); *H04L 67/306* (2013.01); *H04M 15/28* (2013.01); *H04M 15/47* (2013.01); *H04M 15/58* (2013.01); *H04M 15/61* (2013.01); *H04M 15/80* (2013.01); *H04W 8/18* (2013.01); *H04W 12/126* (2021.01); *H04W 4/24* (2013.01)

(58) Field of Classification Search
CPC ...... H04M 15/54; H04M 15/43; H04M 15/47; H04M 15/28; H04M 15/58; H04M 15/61; H04M 15/80; H04M 17/103; H04M 15/41; G06Q 30/246; G06Q 40/00; G06Q 40/02;
(Continued)

(56) References Cited

U.S. PATENT DOCUMENTS

2002/0161723 A1\* 10/2002 Asokan ............... H04L 63/0823
705/67
2006/0040642 A1\* 2/2006 Boris .................... H04W 8/205
455/407

(Continued)

*Primary Examiner* — Rafael Pérez-Gutiérrez
*Assistant Examiner* — Xiang Zhang
(74) *Attorney, Agent, or Firm* — Mannava & Kang, P.C.

(57) ABSTRACT

Method and system for revenue maximization in a communication network. This invention relates to management of communication networks and more particularly to monitoring information of a subscriber of a communication network. Embodiments herein enable the network operator to collect and profile usage information of a subscriber on a User Equipment (UE) with the intention of using the information for revenue maximization applications and preventing fraud for a network operator, wherein revenue maximization applications include but are not limited to fraud management, revenue assurance, churn management, customer experience management, credit risk management and partner settlement.

27 Claims, 12 Drawing Sheets

Related U.S. Application Data application No. PCT/IN2014/000668, filed on Oct. 20, 2014.

(51) Int. Cl.
*H04W 8/18* (2009.01)
*H04L 29/08* (2006.01)
*H04W 12/126* (2021.01)
*H04W 4/24* (2018.01)

(58) Field of Classification Search
CPC ....... H04W 12/126; H04W 8/18; H04W 4/24; H04W 60/04; H04L 67/306
See application file for complete search history.

(56) References Cited

U.S. PATENT DOCUMENTS

| | | | |
|---|---|---|---|
| 2008/0189550 A1* | 8/2008 | Roundtree | H04M 1/72525 713/176 |
| 2008/0254763 A1* | 10/2008 | Brink | H04M 17/00 455/405 |
| 2010/0190469 A1* | 7/2010 | Vanderveen | H04L 12/14 455/406 |
| 2011/0029667 A1* | 2/2011 | Imbimbo | H04W 12/02 709/224 |
| 2012/0142310 A1* | 6/2012 | Pugh | H04W 8/18 455/406 |
| 2013/0325856 A1* | 12/2013 | Soto Matamala | G06F 16/29 707/724 |
| 2014/0128020 A1* | 5/2014 | Ramprasad | H04M 15/28 455/405 |
| 2016/0285861 A1* | 9/2016 | Chester | H04L 63/0823 |

\* cited by examiner

METHOD AND SYSTEM FOR REVENUE MAXIMIZATION IN A COMMUNICATION NETWORK

CROSS REFERENCE TO RELATED APPLICATION

This application claims priority to and is a continuation-in-part of U.S. patent application Ser. No. 15/429,202 filed on Feb. 10, 2017, which is a continuation of PCT Application Number PCT/IN2014/000668 filed on Oct. 20, 2014, which claims priority to Indian Application Number 4721/CHE/2013 filed on Oct. 21, 2013, the contents of which are incorporated herein by reference.

TECHNICAL FIELD

This invention relates to management of communication networks and more particularly to monitoring a subscriber of a communication network.

BACKGROUND

Subscribers of a wireless communication network access a variety of services using the network. The services may comprise of voice based services (such as voice calls in the home area, voice calls outside the home area and so on) or data based services (surfing the internet, chat sessions, map based services, Voice over Internet Protocol (IP) (VoIP) and so on). Network operators may charge the subscribers for accessing the services, which may be based on at least one of a profile of the subscriber, a plan to which the subscriber is subscribed and so on.

Currently, the network operators use a plurality of discrete components spread across the network to monitor the subscribers and charge the subscribers according to the services being availed. On the subscriber availing the service, a network component associated with the service creates a record corresponding to the service availed by the subscriber. Examples of the record are account name, network phone number of the subscriber, date of activation of the connection for the subscriber, IMSI (International Mobile Subscriber Identity), Equipment ID, QoS (Quality of Service), status of the connection and so on. The network component further creates copies of the record to be processed by other network components and systems within the network (examples of the network components and systems comprise of rating, billing, fraud, revenue assurance and data warehouse systems).

In an example, consider a subscriber updating his services from a voice only plan to a voice and data plan. On the subscriber changing the plans, the network operator updates the billing system, mediation system, HLR (Home Location Register), CRMS (Customer Relationship Management), GGSN (Gateway GPRS (General Packet Radio Service) Support Node) and SGSN (Serving GPRS Support Node). Also, the network operator ensures that the systems within the network contain the same information.

The network operator maintains multiple copies of the records of the subscriber in each of the network components. This results in a huge consumption of space, hereby increasing the costs in terms of infrastructure (such as electronic storage components and associated electronic equipment, physical storage location to place the electronic storage components and so on). Also, all the records need to be synced, which further results in a huge bandwidth requirement for transferring the records for a huge number of users across the network at frequent intervals.

Further, analysis on the revenue from the services availed by the subscriber occur after the subscriber has availed the service by analyzing the records. There might be a possibility of missing out on some records or information on the records, which might result in a revenue loss for the network operator. Also, there might be services which might be availed in a fraudulent manner (either intentionally by the subscriber or unintentionally by the subscriber), which may not realize in revenue for the network operator (due to a dispute raised by the subscriber or any other reason by which the subscriber does not pay for the availed service).

BRIEF DESCRIPTION OF THE FIGURES

The embodiments disclosed herein will be better understood from the following detailed description with reference to the drawings, in which.

DETAILED DESCRIPTION OF EMBODIMENTS

Figure 1:
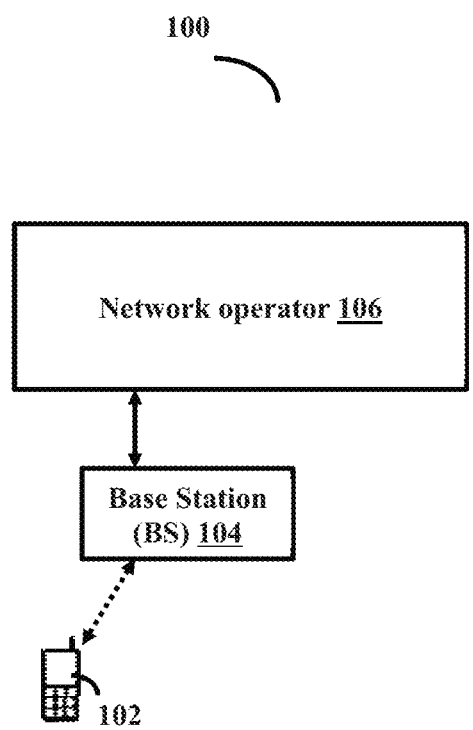
FIG. 1 depicts a communication system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method and system to monitor a subscriber of a communication network. Referring now to the drawings, and more particularly to FIGS. 1 through 11, where similar reference characters denote corresponding features consistently throughout the figures, there are shown preferred embodiments.

Subscriber herein may refer to a person who is accessing the communication network using a User Equipment (UE), a UE accessing the communication network, a network entity or any other entity authorized to avail services available on the communication network.

FIG. 1 depicts a communication system 100, according to embodiments as disclosed herein. The communication system/network 100 referred herein can be configured to provide one or more services to at least one subscriber. Examples of the communication network can be, but is not limited to, a Third Generation Partnership Project (3GPP) 3rd Generation (3G), an Long Term Evolution (LTE/4G) network, an LTE-Advanced (LTE-A) network, a Fifth Generation (5G) New Radio (NR) network, a Wireless Local Area Network (WLAN), a Worldwide Interoperability for Microwave Access (WiMAX/IEEE 802.16), Wi-Fi (IEEE 802.11), an Evolved-UTRA (E-UTRA), an LTE/4G communication system, a 5G/NR communication system, or any other next generation network. Examples of the services can be, but not limited to, voice based services, data based services, and so on. Examples of the voice based services can be, but not limited to, voice calls in a home area, voice calls outside the home area, and so on. Examples of the data based services can be, but not limited to, surfing the Internet, chat sessions, map based services, Voice over Internet Protocol (IP) (VoIP), and so on.

The communication network 100 includes at least one User Equipment 102, at least one Base Station (BS) 104, and at least one network operator 106.

The UE 102 referred herein can be any device that may support the communication network 100 to avail the at least one service. Examples of the UE 102 can be, but is not limited to, a mobile phone, a smartphone, a tablet, a phablet, a personal digital assistant (PDA), a wearable computing device, a vehicle infotainment device, an Internet of Things (IoT) device, a Virtual Reality (VR) device, a gaming console, a medical device, or any other device that is capable of using the communication network 100 to avail the one or more services. The UE 102 can be connected with the network operator 106 through the at least one Base Station (BS) 104. The base station 104 may be at least one of a macro base station, a micro base station, an eNode-B, a femto base station, a pico base station or any other equivalent means to enable the UE 102 to connect with the network operator 106.

Figure 2A:
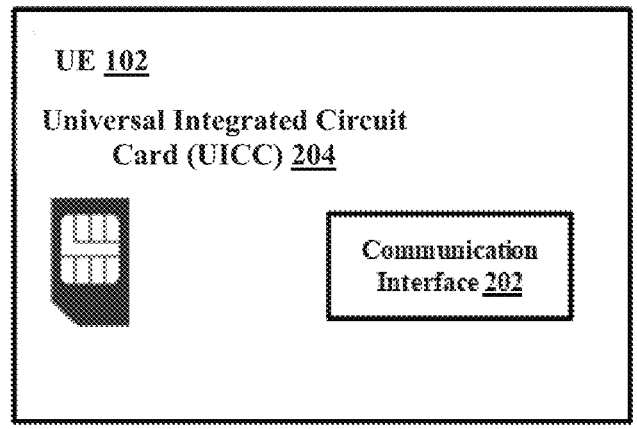
FIG. 2a is an example block diagram depicting various components of a User Equipment (UE) of the communication system, according to embodiments as disclosed herein.
Figure 2B:
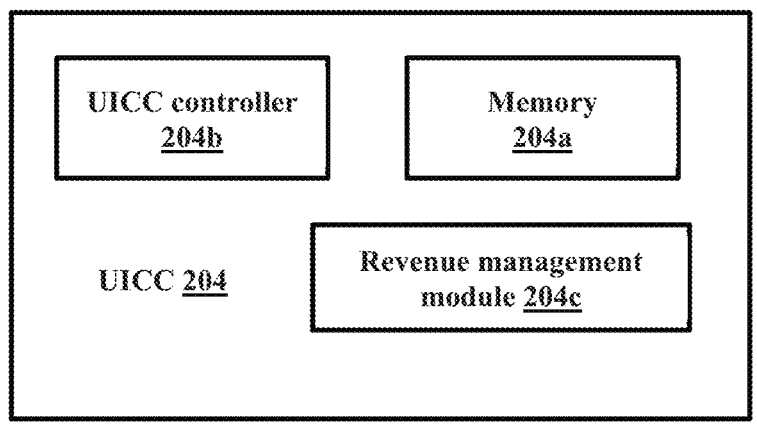
FIG. 2b is an example block diagram depicting various components of a Universal Integrated Circuit Card (UICC) of the UE, according to embodiments as disclosed herein.

The UE 102 includes a revenue management module 204c (as depicted in FIG. 2b). The revenue management module 204c may communicate with the network operator 106 using a suitable means such as, but is not limited to, Over the Air (OTA), a data channel, encrypted Short Messaging Services (SMSs), tone dialing, dual-tone multi-frequency signaling (DTMF) tones, and so on. The revenue management module 204c may be configured to determine/capture a network event, or a pre-defined event initiated on the UE 102. The network event may be initiated by the subscriber of the UE 102, any other user of the UE 102, an application resident on the UE 102, the network operator 106 or any entity capable of initiating the network event on the UE 102 for availing the at least one service. The network event may be an event that is configured by the network operator 106 based on at least one of, but not limited to, subscriber information present with the network operator 106, a plan to which the subscriber has subscribed, and so on. Examples of the network event or the pre-defined event can be, but is not limited to, incoming calls from a specific entity, a call which exceeds a specific time period, outgoing calls to a specific entity, accessing an application on the UE 102, sending a message to a specific entity, installing/opening the application, static information, and so on. Examples of the message can be, but is not limited to, a Short Messaging Service (SMS), Multimedia Messaging Service (MMS), an Instant message or any other equivalent message.

Embodiments herein enable the revenue management module 204c to prepare a profile of the UE 102 and send the profile of the UE 102 to the network operator 106, on determining the network event initiated on the UE 102. On determining the network event, the revenue management module 204c prepares the profile of the UE 102 with respect to the network event. The profile of the UE 102 includes usage of the UE 102 (by the subscriber or by any other authorized person entity) and network usage behavior of the UE 102.

On preparing the profile of the UE 102, the revenue management module 204c checks if the determined network event violates one or more rules. The one or more rules may be pre-configured on the UE 102. Examples of the rules can be, but not limited to, summarization rules, evaluation rules, pattern matching rules and at least one action to be performed on conditions associated with at least one rule being satisfied. The summarization rules are a summary of events occurring in terms of parameters for any network event, which the subscriber may perform using the UE 102. The summarization rules may comprise of heuristics and static information. The static information may include information such as, but not limited to, threshold counts, a list of suspect entities, and so on. Examples of the threshold counts may be a limit on calls going to a specific entity, a large number of SMSs going to a specific entity, a very large number of SMSs being sent in a predefined period of time and so on. Examples of the suspect entities may comprise of a specific entity that is recognized as a fraudulent entity, an incoming call from a recognized telemarketer (when the subscriber is registered with a 'Do-Not-Disturb' database), a Uniform resource Locator (URL) identified as a phishing URL and so on. The summarization rules may be modified and/or updated by the network operator at any point in time. The evaluation rules may comprise of thresholds on summarized elements or rules for specific events occurring.

The revenue management module 204c performs at least one action with respect to the determined network event, if the determined network event violates the one or more rules. In an embodiment, the at least one action may include at least one of, but not limited to, blocking the call, blocking the application, or the like. For example, if the network event is the subscriber dialing a fraudulent entity, the revenue management module may block the call. The revenue management module 204c may further make an entry in a database through a communication channel in a network equipment of the network operator 106 (not shown) using a suitable means such as, but not limited to, OTA, a data channel, encrypted SMSs, tone dialing, DTMF tones and so on. This may be done in a manner invisible to the subscriber, wherein the entry comprises of details of the fraudulent entity, time the subscriber tried to dial the entity and so on.

In an embodiment, the at least one action may be sending an alert to the network operator 106. The alert may comprise of a unique identifier (Id) of the subscriber (which may be at least one of International Mobile Subscriber Identity (IMSI)/phone number), a profile Id/rule Id, start time of violation, end time of violation, value of the profile, time of transmission of the alert and so on.

In an embodiment, the at least one action may be at least one of, sending the profile of the UE 102 to the network operator 106, sending the profile of the UE 102 and the rules to the network operator 206, and so on. The revenue management module 204c may send the profile of the UE 102 and/or the rules and/or the alert to the network operator 106 using a suitable means such as, but not limited to, Over the Air (OTA), a data channel, encrypted SMSs, tone dialing, DTMF tones and so on. This may be done in a manner invisible to the subscriber. In an example, the revenue management module 204c may send the profile of the UE 102 and/or the rules to the network operator 106 at periodic intervals, wherein the periodic intervals may be defined by the network operator 106. In another example, the revenue management module 204c may send the profile of the UE 102 and/or the rules to the network operator 106, on occurrence of pre-defined event(s), wherein the event(s) may be pre-defined by the network operator 106. In an example, the revenue management module 204c may send the profile of the UE 102 and/or the rules on a single entry being updated, as defined by the network operator 106. In another example, the revenue management module 204c may send the profile of the UE 102 and/or the rules on a pre-defined number of entries being updated, as defined by the network operator 106.

Figure 2C:
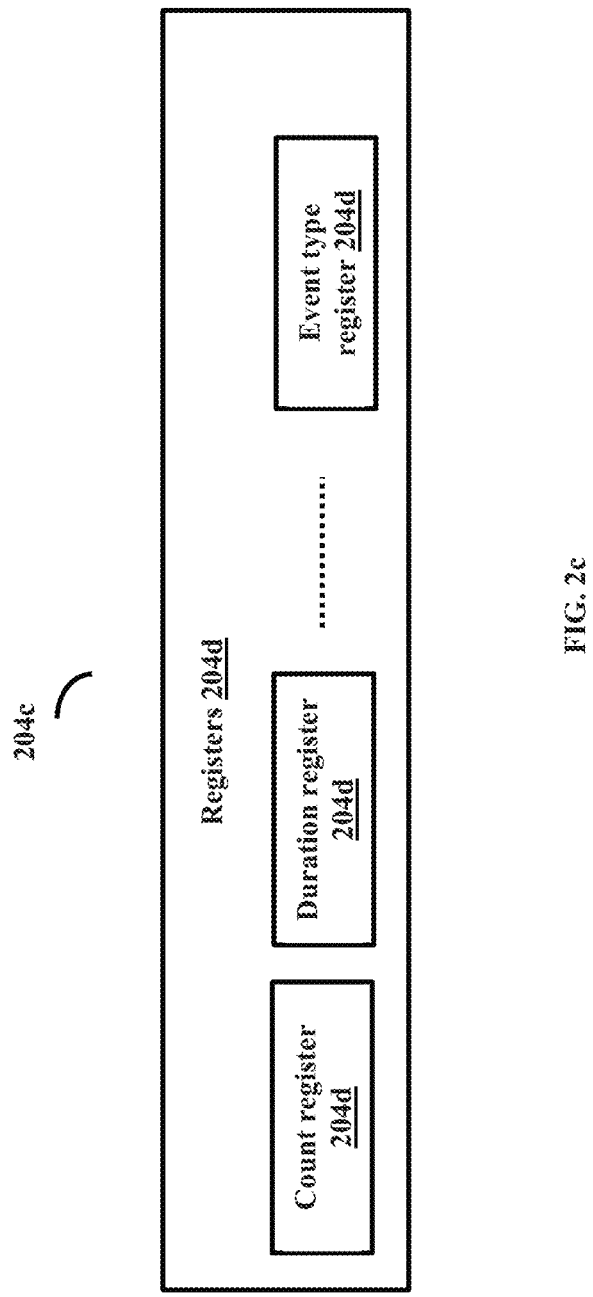
FIG. 2c depicts a revenue management module including registers for storing information related to a network event, according to embodiment as disclosed herein.

Embodiments herein enable the revenue management module 204c to maintain registers 204d (as depicted in FIG. 2c) for storing information related to the determined network event and send the stored information related to the determined network event to the network operator 106.

The revenue management module 204c may maintain the registers 204d for storing the information related to the determined network event. The information related to the network event may include information about at least one of, but not limited to, a number of calls made by the subscriber of the UE 102, a number of messages sent by the subscriber of the UE 102, a duration of a call, a frequency of visiting Uniform Resource Locators (URLs), a frequency of using at least one application, and so on. The revenue management module 204c may maintain different types of registers for each information of the network event. The registers may include at least one of, but not limited to, count registers, duration registers, event type registers, and so on. For example, the revenue management module 204c may maintain the count registers for a message based event (an example of the network event) to store information related to a number of messages sent/received. For another example, the revenue management module may maintain the count registers and the duration registers for a call based event (an example of the network event) to store information related to a number of incoming and outgoing calls and a duration of each call. Each register may be associated with a counter, which specify a count value of the information stored in each register. For example, the counter associated with the count registers maintained for the call based event may specify a number of calls initiated/received by the subscriber of the UE 102. For another example, the counter associated with the count registers maintained for the message based event may specify a number of messages sent/received by the subscriber of the UE 102.

The revenue management module 204c may fetch the information related to the network event from the registers 204d and send the fetched information related to the network event to the network operator 106. The revenue management module 204c may send the information related to the network event to the network operator 106 over a silent message. In an example, the message can be a SMS message. In an embodiment, the revenue management module 204c may fetch and send the information related to the network event from the registers 204d to the network operator 106, when the value of the counters associated with the registers maintained for the network event satisfies (for example: greater than or equal to) a threshold value. The threshold value may be configured by the network operator 106 on the UE 102. The threshold value specifies the value of the counters for each register.

In an embodiment, the revenue management module 204c may send the information related to the network event to the network operator 106, on receiving a message including a secret key from the network operator 106. In an example, the message including the secret key may be received as a SMS from a pre-defined operator number of the network operator 106. The secret key may include a hash of an IMSI. The IMSI may be a unique number that is used by the network operator 106 to identify the UE 102. On receiving the message including the secret key, the revenue management module 204c compares the received secret key/hash of the IMSI with a self-generated hash of the IMSI. If the received secret key/hash of the IMSI matches with the self-generated hash, the revenue management module 204c fetches the information related to the network event from the registers 204d and sends the fetched information related to the network event to the network operator 106.

The network operator 106 may be configured to charge the subscriber of the UE 102 for availing the one or more services. The network operator 106 may also be configured to receive data from the network operator 106 and generate a decision for revenue maximization. The data may include at least one of but not limited to, the information related to the network event, the alert, the profile of the UE 102 and/or the rules. In an example, the decision may include at least one of, but not limited to, updating charges to be paid by the subscriber, reversing the charges for the subscriber, and so on.

FIG. 1 shows exemplary units of the communication system 100, but it is to be understood that other embodiments are not limited thereon. In other embodiments, the communication system 100 may include less or more number of units. Further, the labels or names of the units are used only for illustrative purpose and does not limit the scope of the embodiments herein. One or more units can be combined together to perform same or substantially similar function in the communications system 100.

FIG. 2a is an example block diagram depicting various components of the UE 102, according to embodiments as disclosed herein. The UE 102 includes a communication interface 202 and a Universal Integrated Circuit Card (UICC) 204.

The communication interface 202 may be configured to enable the revenue management module 204c to communicate with at least one external entity (for example: the at least one BS 104, the network operator 106, or the like) via an interface such as, but not limited to, OTA, a data channel, encrypted SMSs, tone dialing, DTMF tones and so on.

The UICC 204 may be a new generation Subscriber Identification Module (SIM). The UICC 204 may include one or more SIMs. The UICC 204 has a unique identifier that may be used to identify the UE 102 in the communication network 100 and to determine the plan and the services for which the subscriber of the UE 102 is subscribed. The UICC 204 may include the revenue management module 204c for determining the network event initiated on the UE 102 and providing the information related to the network event to the network operator 106. The revenue management module 204c also prepares the profile of the UE 102 with respect to the determined network event and sends the profile of the UE 102 and/or the rules to the network operator 106, if the determined network event violates the one or more rules.

As depicted in FIG. 2b, the UICC 204 includes a memory 204a and a UICC controller 204b.

The memory 204a may store at least one of, but not limited to, the revenue management module 204c, the one or more rules, the profile of the UE 102, the network event configured by the network operator 106, the hash of the IMSI, and so on. The revenue management module 204c may be resident in the memory 204a in a manner to be invisible to the subscriber, in accordance with GSM 11.11 and GSM 11.14 standards. Examples of the memory 204a can be, but not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 204a may include one or more computer-readable storage media. The memory 204a may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 204a may, in some examples, be considered a non-transitory storage medium. The term "non-transitory" may indicate that the storage medium is not embodied in a carrier wave or a propagated signal. However, the term "non-transitory" should not be interpreted to mean that the memory 204a is non-movable. In certain examples, a non-transitory storage medium may store data that can, over time, change (e.g., in Random Access Memory (RAM) or cache).

The UICC controller 204b may be at least one of, but is not limited to, a single processor, a plurality of processors, multiple homogeneous or heterogeneous cores, and so on. The UICC controller 204b may be configured to implement the revenue management module 204c (that is configured by the network operator 106) in the memory 204a. The UICC controller 204b may also be configured to update the revenue management module 204c, on receiving updates related to the revenue management module 204c from the network operator 106. The UICC controller 204b may also be configured to enable/execute the revenue management module 204c to perform at least one intended function.

The revenue management module 204c may be invisible to the subscriber of the UE 102. The revenue management module 204c communicates with the network operator 106. The communication between the revenue management module 204c and the network operator 106 may be done in a manner invisible to the subscriber. The revenue management module 204c may also be updated and/or modified by the network operator 106 via the communication interface 202, using a suitable means such as Over the Air (OTA), a data channel, encrypted SMSs, tone dialing, DTMF tones and so on. This may be done in a manner invisible to the subscriber.

The revenue management module 204c may store information as an Elementary File (EF), which may be of fixed length format. The EF comprises of multiple records separated by a record separator, wherein each record will be for one type of profile element. Each record will contain fields of fixed length. Examples of fields which may be included in each record are profile element id, start time of profiling, end time of profiling, value of profile element, alerted flag and so on. The revenue management module may be stored in at least one of DFGSM or DF Telecom folders of the file system.

In an embodiment, the revenue management module 204c may use a Java Card Runtime Environment (JCRE). which includes a Java Card Virtual Machine and Java Card Application Programming Interface (API) classes for performing the at least one intended function. In an embodiment, the revenue management module 204c may be implemented as a Java applet/application on the UICC 204 of the UE 102. In an example, the revenue management module 204c may be implemented in individual or selected SIMs of the UICC 204. In another example, the revenue management module 204c may be implemented in all the SIMs of the UICC 204. In another example, the revenue management module 204c may be implemented in all the SIMs or the SIMs of the subscribers of a specific rate plan (for example; the subscribers with an international roaming plan). The revenue management module 204c may be pushed as an OTA update for the existing connections (i.e., for already activated SIM). The revenue management module 204c may be pushed as a profile update, when the SIM is activated for a first time for new subscribers.

The revenue management module 204c may be configured to track/determine the network event initiated on the UE 102. In an example, the network event may be specific to at least one of but not limited to, calls being placed (SET UP CALL), messages being sent and received (SEND SMS), data channel being set up (OPEN CHANNEL), incoming calls from a specific entity, a call which exceeds a specific time period, outgoing calls to a specific entity, accessing an application on the UE 102, sending a message to a specific entity, installing/opening the application, static information, and so on. The type of network event to determine may be configured on the UE 102 by the network operator 106 and may set up during a registration of the revenue management module 204c within the SIM of the UICC 204 (i.e., when the UE 102 registers with the network operator 106).

The UICC controller 204b provides data specific to the network event to the revenue management module 204c over as an Application Protocol Data Unit (APDU), on initiating the network event (that is configured on the UE 102 by the network operator 106). The revenue management module 204c determines the network event and the information related to the network event by parsing the received APDU. The revenue management module 204c registers/stores the determined network event in the memory 204a. Consider an example scenario, wherein the subscriber sends a message (for example: SMS message). In such a scenario, the UICC controller 204b provides SMS data to the revenue management module 204c over the APDU. The revenue management module 204c parses the APDU and determines that the network event is a SMS based event. The revenue management module 204c also determines the information related to the SMS based event such as, but not limited to, a number of SMS messages sent/received, information about if the sent SMS message is a local message or an international message, and so on.

The revenue management module 204c may store the determined information related to the network event. In an embodiment as depicted in FIG. 2c, the revenue management module 204c maintains the registers 204d for storing/uploading the information related to the network event. The registers 204d may include the count registers, duration registers, event type registers, and so on for each information of the network event. Each register may associate with the counters for specifying the count value of the information stored in each register. The revenue management module 204c may send the information related to the network event stored in the registers 204d to the network operator 106 for fraud detection or revenue assurance. The revenue management module 204c may send the information related to the network event to the network operator 106 over the message such as, but is not limited to, a SMS message, an MMS message, an instant message, or any other equivalent message.

In an embodiment, the revenue management module 204c may fetch and send the information related to the network event from the registers 204d to the network operator 106, when the counters associated with the registers satisfy the pre-configured threshold value.

In an embodiment, the revenue management module 204c may fetch and send the information related to the network event from the registers 204d to the network operator 106, on receiving the message (for example: a SMS message) with the specific secret key/hash of the IMSI. On enabling the revenue management module 204c by the UICC controller 204b, the revenue management module 204c applies a hash function on the IMSI and generates the hash of the IMSI (i.e., the self-generated hash). The revenue management module 204c stores the generated hash of the IMSI in the memory 204a. Further, on receiving the message including the secret key/hash of the IMSI, the revenue management module 204c checks if the received hash of the IMSI with the stored/self-generated hash. If the received hash of the IMSI matches with the stored/self-generated hash, the revenue management module 204c fetches the information related to the network event from the registers 204d and sends the fetched information to the network operator 106.

The revenue management module 204c may also be configured to check the information related to the network event stored in the registers 204c to determine a fraudulent network event. Examples of the fraudulent network event may be, but not limited to, fraudulent usage of the SIM(s) for making calls and sending messages, or the like. In an example, the revenue management module 204c may check the information related to the network event stored in the registers 204c continuously. In an example, the revenue management module 204c may check the information related to the network event stored in the registers 204d at periodic intervals. In an example, the revenue management module 204c may check the information related to the network event stored in the registers 204d, on occurrence of pre-defined conditions. Examples of the pre-defined conditions may be, but not limited to, volume/count of outgoing calls may increase than incoming calls by a pre-defined threshold, or the like. Based on the determined fraudulent network event, the revenue management module 204c may further perform at least one action. Examples of the at least one action may include, but not limited to, preventing establishment of future calls, and messages, or the like.

Consider an example scenario, wherein the revenue management module 204c using the information stored in the registers 204d determines a low ratio of incoming calls to outgoing calls. In such a scenario, the revenue management module 204c determines that initiating the outgoing calls using the SIM may be fraudulent usage of the SIM for the establishment of the calls, essentially when the calls are terminated internationally in the network 100 via the Internet to bypass termination fees of the network operator 106. On determining the fraudulent usage of the SIM, the revenue management module 204c may prevent establishing of further calls using the corresponding SIM.

The revenue management module 204c may also be configured to send at least one of the alert, the profile of the UE 102, the one or more rules, and so on to the network operator 106, on determining the network event initiated on the UE 102. The revenue management module 204c checks if the determined network event violates the one or more rules. If the determined network event violates the one or more rules, the revenue management module 204c sends the at least one of the alert, the profile of the UE 102, the one or more rules, and so on to the network operator 106 over the suitable means such as, OTA, a data channel, encrypted SMSs, tone dialing, DTMF tones and so on.

The revenue management module 204c may also be configured to store an entry in the memory 204a, on determining the network event. In an example, the entry may comprise of at least one of, but not limited to, fraudulent entity, time the subscriber tried to dial the entity, and so on.

Figure 3:
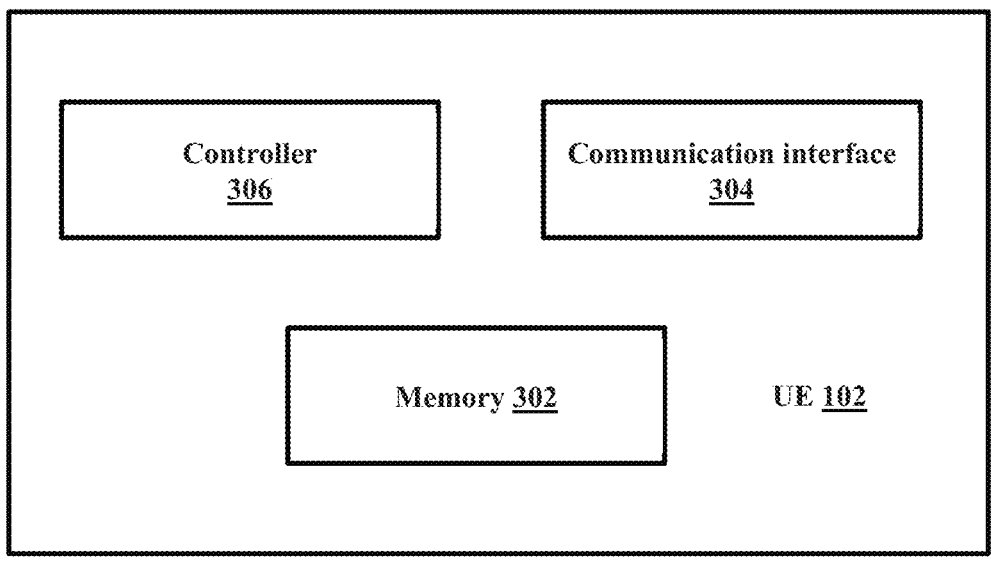
FIG. 3 is another example diagram depicting various components of the UE, according to embodiments as disclosed herein.

FIG. 3 is another example diagram depicting various components of the UE 102, according to embodiments as disclosed herein. The UE 102 includes a memory 302, a communication interface 304, and a controller 306.

The memory 302 may store at least one of, but not limited to, the revenue management module 204c, the one or more rules, the profile of the UE 102, the network event configured by the network operator 106, and so on. In an example, the revenue management module 204c may be embedded as an application in the memory 302 (for example: Read Only Memory (ROM)), wherein the application may be executed on the controller 306 as a root process. The revenue management module 204c may be invisible to the subscriber.

The communication interface 304 may be configured to enable the revenue management module 204c to communicate with the network operator 106 over the suitable means such as, OTA, a data channel, encrypted SMSs, tone dialing, DTMF tones and so on. The communication between the revenue management module and the network operator may be done in a manner invisible to the subscriber.

The controller 306 may be at least one of, but is not limited to, a single processor, a plurality of processors, multiple homogeneous or heterogeneous cores, and so on. The controller 306 may be configured to implement the revenue management module 204c (that is configured by the network operator 106) in the memory 302 as the application. The controller 306 may also be configured to update the revenue management module 204c, on receiving updates related to the revenue management module 204c from the network operator 106. The controller 306 may also be configured to enable/execute the revenue management module 204c to perform at least one intended function.

The revenue management module 204c may be configured to determine the network event initiated on the UE 102 and store the information related to the network event in the registers 204d. The revenue management module 204c fetches the information related to the network event from the registers 204d and sends the fetched information related to the network event to the network operator 106 for the fraud detection and revenue maximization. The revenue management module 204c also sends at least one of the alert, the profile of the UE 102, and the one or more rules to the network operator 106 for the fraud detection and revenue maximization, if the determined network event violates the one or more rules.

FIGS. 2a, 2b, and 3 shows exemplary units of the UE 102, but it is to be understood that other embodiments are not limited thereon. In other embodiments, the UE 102 may include less or more number of units. Further, the labels or names of the units are used only for illustrative purpose and does not limit the scope of the embodiments herein. One or more units can be combined together to perform same or substantially similar function in the UE 102.

Figure 4:
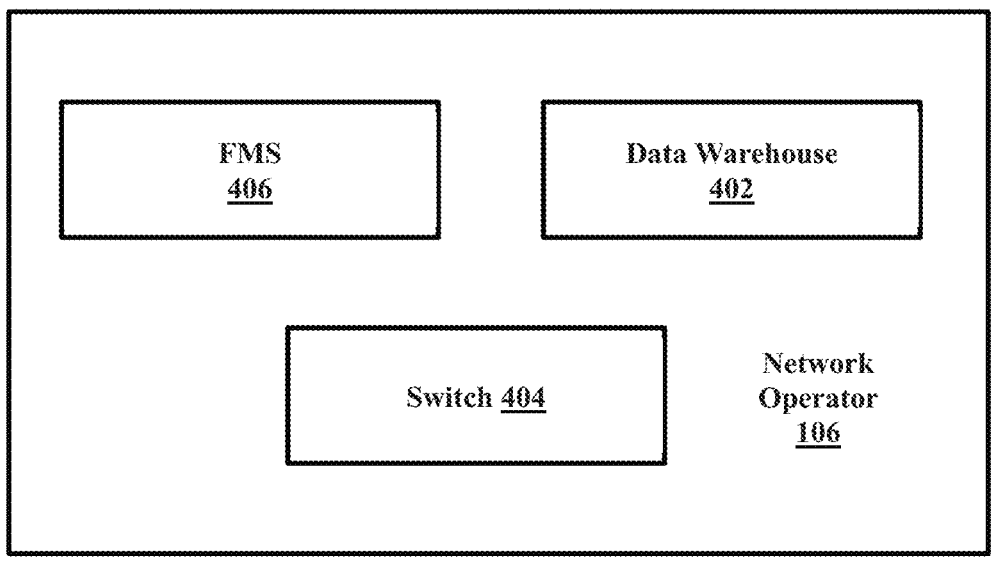
FIG. 4 is an example block diagram depicting components of a network operator, according to embodiments as disclosed herein.

FIG. 4 is an example block diagram depicting components of the network operator 106, according to embodiments as disclosed herein. The network operator 106 includes a data warehouse 402, a switch 404, and a central Fraud Management system (FMS) or Revenue Assurance (RA) system 406.

The data warehouse 402 may store at least one of, but not limited to, the plan and the services to which the subscriber of the UE 102 is subscribed, the billing/charging records of the UE 102, the information related to the network event, the profile of the UE 102, the one or more rules, and so on.

The switch 404 may connect the network operator 106 to the UE 102 through the at least one BS 104. The switch 404 may be a network element used for processing the calls initiated between the UEs 102. The switch 404 sets up a connection (circuit) between an originating UE 102 and a terminating UE 102. Also, the switch enables functions such as, but not limited to, conference calling, voice mail, and so on.

The FMS 406 may be at least one of, but is not limited to, a single processor, a plurality of processors, multiple homogeneous or heterogeneous cores, a Central Processing Unit (CPU), a server, a microcontroller, and so on. The FMS 406 may be configured to receive data from the UE 102 over suitable means such as, Over the Air (OTA), a data channel, encrypted SMSs, tone dialing, DTMF tones and so on and collate and store the received data for the UE 102 in the data warehouse 402. The received data may include at least one of but not limited to, the information related to the network event, the profile of the UE 102, the one or more rules, the alert, and so on. The FMS 406 may also be configured to analyze/parse the received data of the UE 102 and compare the parsed data with the billing records generated by the network operator 106 for the UE 102 to generate the decision for the revenue maximization. In an example, the decision may be charging the subscriber for certain network event, on detecting that the subscriber of the UE 102 fails to pay the bill for the certain network event using the received data, updating the charges to be paid for the subscriber using the received data, and so on.

Figure 5:
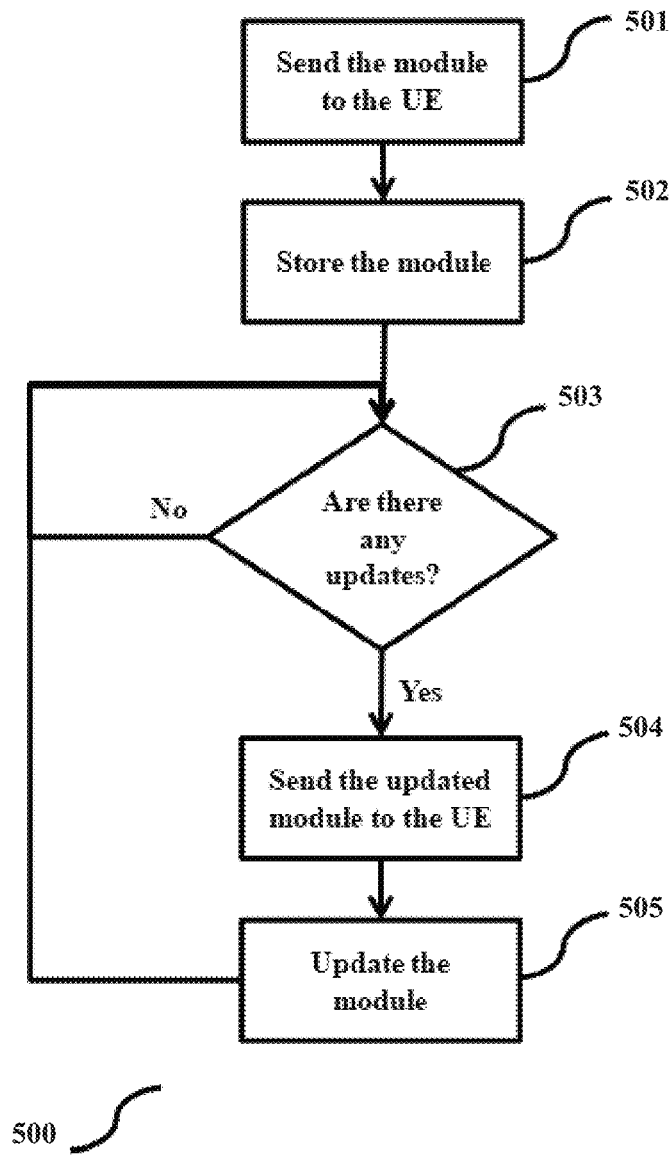
FIG. 5 is a flowchart illustrating a process of the network operator configuring the revenue management module on the UE, according to embodiments as disclosed herein.

FIG. 5 is a flowchart illustrating a process of the network operator configuring the revenue management module on the UE, according to embodiments as disclosed herein.

The network operator 106 sends (501) the revenue management module 204c to the UE 101. The network operator 106 may send the revenue management module using a suitable means such as OTA, a data channel, encrypted SMSs, tone dialing, DTMF tones and so on. This may be done in a manner invisible to the subscriber. In an embodiment, the network operator 106 may provide the UE 102 and/or the UICC 204a, with the revenue management module 204c. On receiving the revenue management module 204c from the network operator 106, the UE 102 stores (502) the revenue management module 204c in the appropriate location, based on instructions provided by the network operator 106. The UE 102 may store the revenue management module 204c in the UICC 204b. The UE 102 may also install the revenue management module 204c as an application on the UE 102. The revenue management module may be stored in a manner invisible to the subscriber. A check is maintained (503) for any updates to revenue management module 204c. The revenue management module 204c may be configured to check for updates at periodic intervals or on a specific event occurring. The network operator 106 may also be configured to push updates to the revenue management module 204c, on an update being available. On updates being available, the updated revenue management module is sent (504) to the UE 102. The UE 102 then updates (505) the revenue management module 204c. The various actions in method 500 may be performed in the order presented, in a different order or simultaneously. Further, in some embodiments, some actions listed in FIG. 5 may be omitted.

Figure 6:
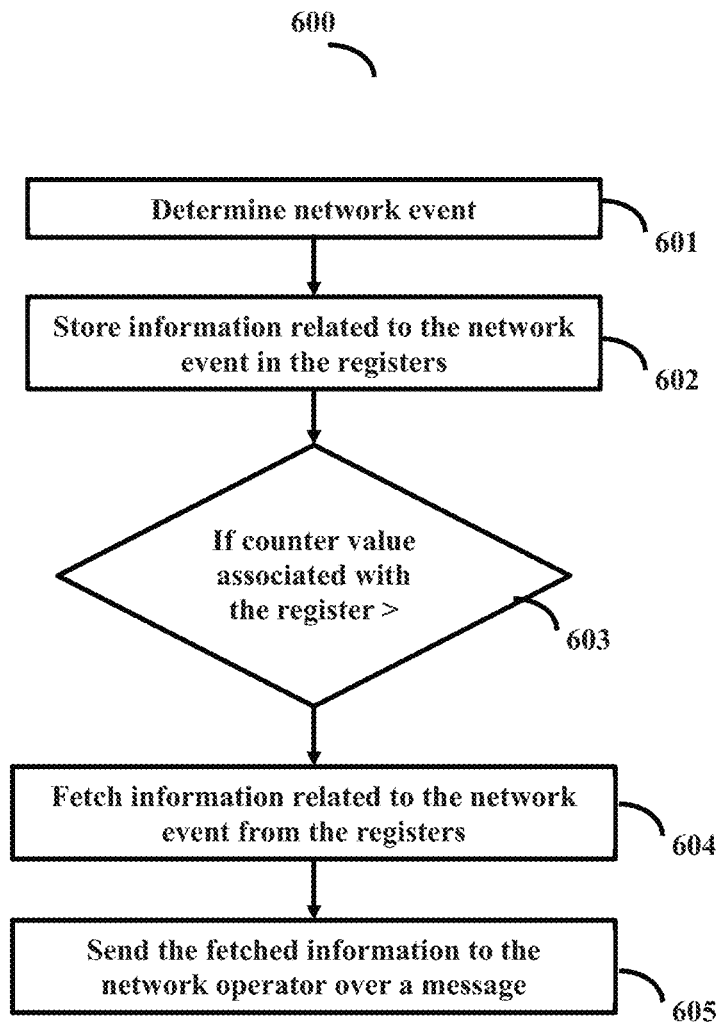
FIG. 6 is a flowchart illustrating a process of the revenue management module sending information related to the network event to the network operator for revenue maximization, according to embodiments as disclosed herein.

FIG. 6 is a flowchart illustrating a process of the revenue management module 204c sending the information related to the network event to the network operator 106 for revenue maximization, according to embodiments as disclosed herein.

The revenue management module 204c determines (601) the network event initiated on the UE 102. The network event may be initiated by the subscriber of the UE 102, any other user of the UE 102, an application resident on the UE 102, the network operator 106 or any entity capable of initiating the network event on the UE 102. On determining the network event, the revenue management module 204c stores (602) the information related to the network event in the registers 204d. The revenue management module 204c may maintain registers such as, but not limited to, the count registers, the duration registers, the event type registers, and so on for each network event. The revenue management module 204c stores the information related to the determined network event in the suitable register(s). For example, if the initiated network event is an outgoing call to an international entity, the revenue management module 204c updates the count register by 1, the duration register with a duration of the initiated call, and the event type register with the international call.

The revenue management module 204c checks (603) if the counter(s) associated with the register(s) that have been maintained for the determined network event satisfies the pre-configured threshold. The threshold may be pre-configured by the network operator 106 on the revenue management module 204c. If the counter(s) associated with the register(s) that have been maintained for the determined network event satisfies the pre-configured threshold, the revenue management module 204c fetches (604) the information related to the network event from the respective registers. The revenue management module sends (605) the fetched information related to the network event to the network operator 106 for the revenue maximization. The revenue management module 204c sends the information related to the network event to the network operator 106 over the message (for example: the SMS). The various actions in method 600 may be performed in the order presented, in a different order or simultaneously. Further, in some embodiments, some actions listed in FIG. 6 may be omitted.

Figure 7:
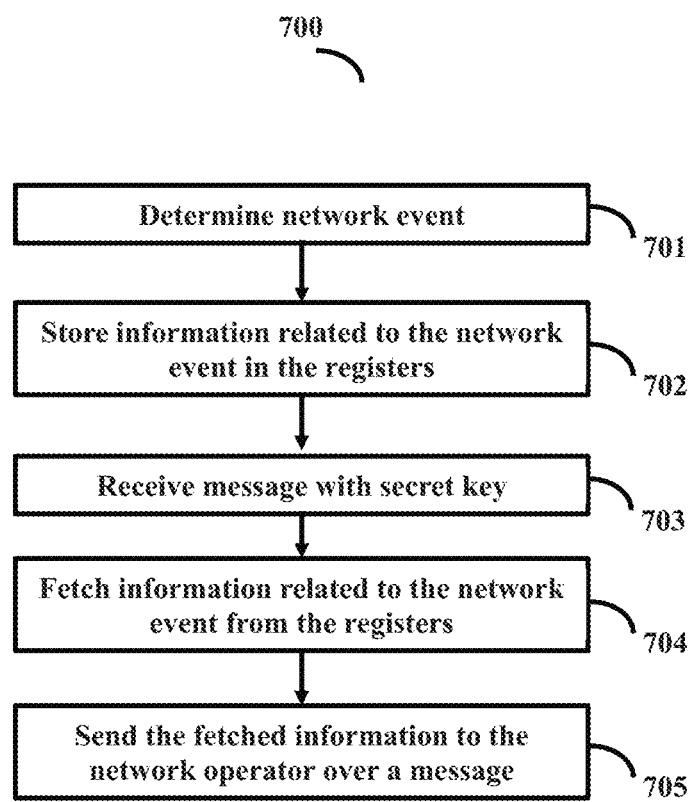
FIG. 7 is another flowchart illustrating a process of the revenue management module sending the information related to the network event to the network operator for revenue maximization, according to embodiments as disclosed herein.

FIG. 7 is another flowchart illustrating a process of the revenue management module 204c sending the information related to the network event to the network operator 106 for revenue maximization, according to embodiments as disclosed herein.

The revenue management module 204c determines (701) the network event initiated on the UE 102. On determining the network event, the revenue management module 204c stores (702) the information related to the network event in the registers 204d. The revenue management module 204c may maintain registers 204d such as, but not limited to, the count registers, the duration registers, the event type registers, and so on for each network event. The revenue management module 204c stores the information related to the determined network event in the suitable register(s). The revenue management module 204c receives (703) the message with the secret specific key from the network operator 106. On receiving the message with the secret key, the revenue management module 204c fetches (704) the information related to the network event from the respective registers. The revenue management module sends (705) the fetched information related to the network event to the network operator 106 for the revenue maximization. The revenue management module sends the information related to the network event to the network operator 106 over the message (for example: the SMS). The various actions in method 700 may be performed in the order presented, in a different order or simultaneously. Further, in some embodiments, some actions listed in FIG. 7 may be omitted.

Figure 8:
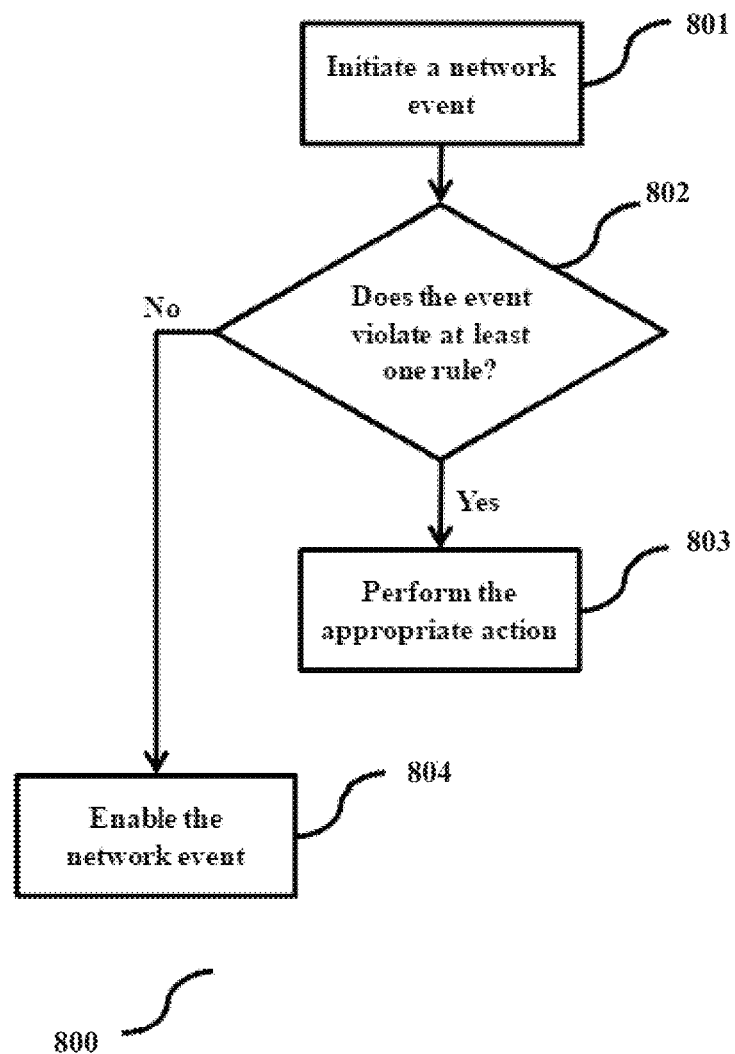
FIG. 8 is a flowchart illustrating a process of the revenue management module enforcing the rules on a subscriber availing services, according to embodiments as disclosed herein.

FIG. 8 is a flowchart illustrating a process of the revenue management module enforcing the rules on a subscriber availing services, according to embodiments as disclosed herein. On the network event being initiated (801) on the UE 102 (wherein the network event may be initiated by the subscriber of the UE 102, any other user of the UE 102, an application resident on the UE 102, the network operator or any entity capable of initiating a network event on the UE 102), the revenue management module 204c checks (802) if the event violates at least one summarization rule. For example, a call to a fraudulent entity, a visit to a URL of a phishing website, a large number of outgoing SMSs (wherein the number of SMSs is greater than a threshold as defined by the network operator) and so on. If the network event violates at least one summarization rule, the revenue management module 204c performs (803) the pre-defined action. The pre-defined action may comprise of at least one of blocking the network event, raising an alert with the network operator, making an entry in the memory and so on. If the network event does not violate at least one summarization rule, the revenue management module 204c enables (804) the network event to proceed without recording of the event by the revenue management module 204c. The various actions in method 800 may be performed in the order presented, in a different order or simultaneously. Further, in some embodiments, some actions listed in FIG. 8 may be omitted.

Figure 9:
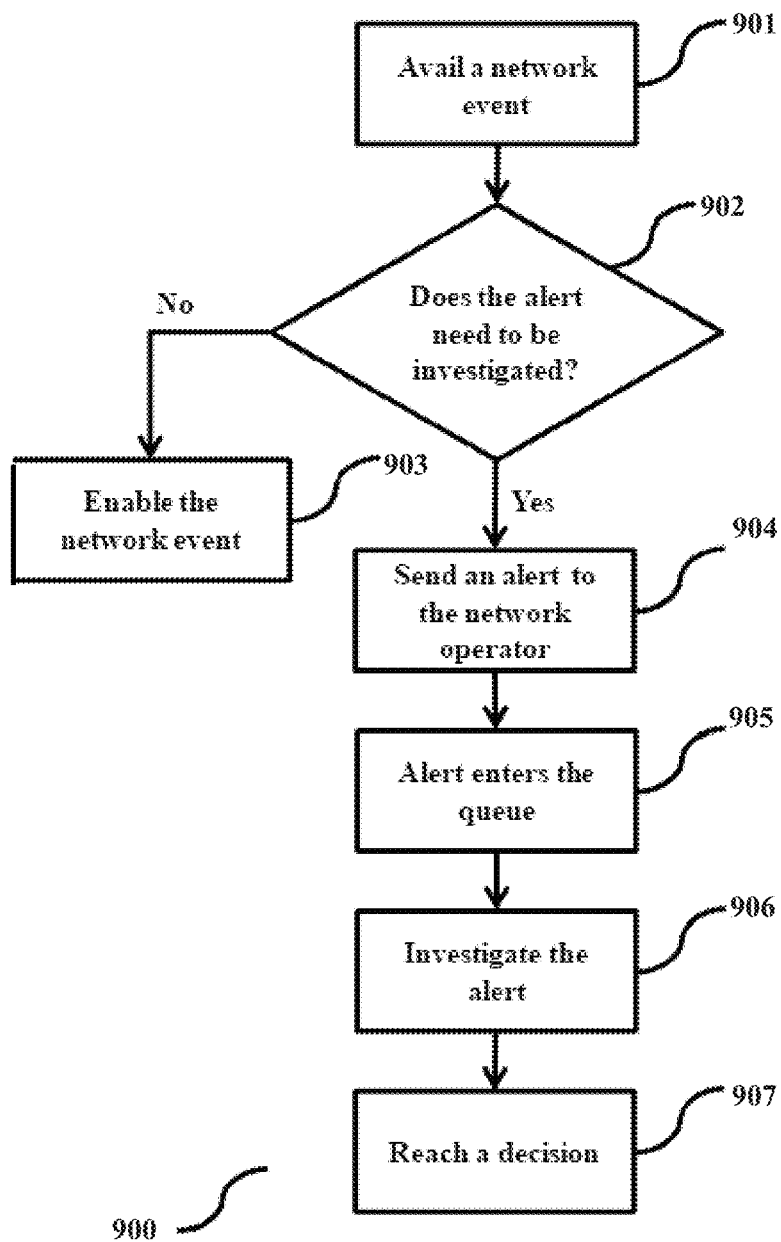
FIG. 9 is a flowchart illustrating the process of the revenue management module providing an alert to the network operator, according to embodiments as disclosed herein.

FIG. 9 is a flowchart illustrating the process of the revenue management module providing the alert to the network operator 106, according to embodiments as disclosed herein. On the network event being initiated (901) on the UE 102, the revenue management module 204c checks (902) if the event needs to be investigated. For example, if the event is a call to a fraudulent entity which charges for incoming calls, then the subscriber will be charged for the call. However, the subscriber may dispute the charge if the subscriber has not made the call. The network operator 106 may have to reverse the charges, if the call was made fraudulently. If the network event does not need investigation, the revenue management module 204c enables (903) the network event to proceed in a normal manner. If the event needs to be investigated, the revenue management module 204c sends (904) an alert to the network operator 106. In an example, the alert may comprise of the Unique Id of the subscriber (which may be at least one of IMSI/Phone Number), Profile Id/Rule Id, Start time of violation, End time of violation, Value of Profile, time of transmission of the alert and so on. The alert enters (905) a queue at the network operator 106. The network operator 106 investigates (906) the alert, if there is a possibility of a fraud occurring and based on the investigation, the network operator reaches (907) a decision. The decision may be reflected using an appropriate means to the subscriber. The charges to be paid by the subscriber may be updated accordingly. The various actions in method 900 may be performed in the order presented, in a different order or simultaneously. Further, in some embodiments, some actions listed in FIG. 9 may be omitted.

Figure 10:
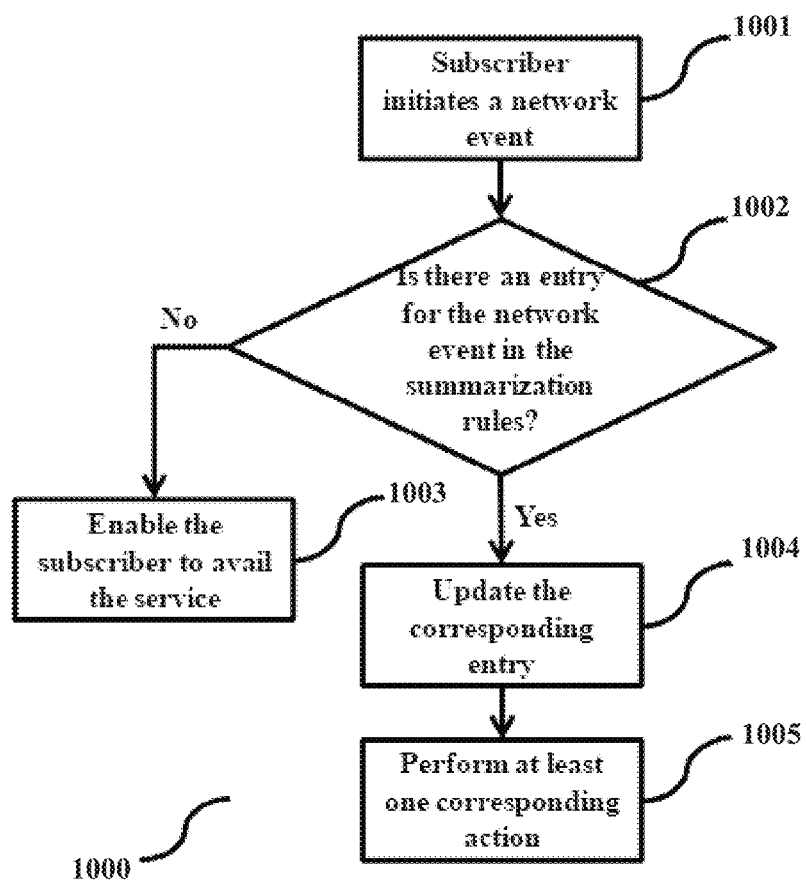
FIG. 10 is a flowchart illustrating the process of maintaining a profile for the subscriber, according to embodiments as disclosed herein.

FIG. 10 is a flowchart illustrating the process of maintaining a profile for the subscriber, according to embodiments as disclosed herein. On the network event being initiated (1001) on the UE 102, the revenue management module 204c checks (1002) if there is an entry for the event in the summarization rules. For example, an outgoing call, a visit to a URL, an international call, an outgoing SMS and so on. If the network event matches at least one summarization rule, the revenue management module 204c updates (1004) the corresponding entry and enables (1003) the network event to proceed in a normal manner. An example of the update for an outgoing call may be duration of the call, the called entity, the start time of the call, the end time of the call and so on. Another example of the update for an outgoing SMS may be destination of the SMS, time the SMS was sent and so on. If the network event does not match at least one summarization rule, the revenue management module 204c enables (1004) the network event to proceed in a normal manner. The revenue management module 204c further sends (1005) the information from the UE 102 to the network operator 106. The revenue management module 204c may send the information at intervals, wherein the intervals may be defined by the network operator 106. The revenue management module 204c may send the information on a pre-defined event occurring, wherein the event(s) may be defined by the network operator 106. The revenue management module 204c may send the information to the network operator using a suitable means such as OTA, a data channel, encrypted SMSs, tone dialing, DTMF tones and so on. This may be done in a manner invisible to the subscriber. The various actions in method 1000 may be performed in the order presented, in a different order or simultaneously. Further, in some embodiments, some actions listed in FIG. 10 may be omitted.

Figure 11:
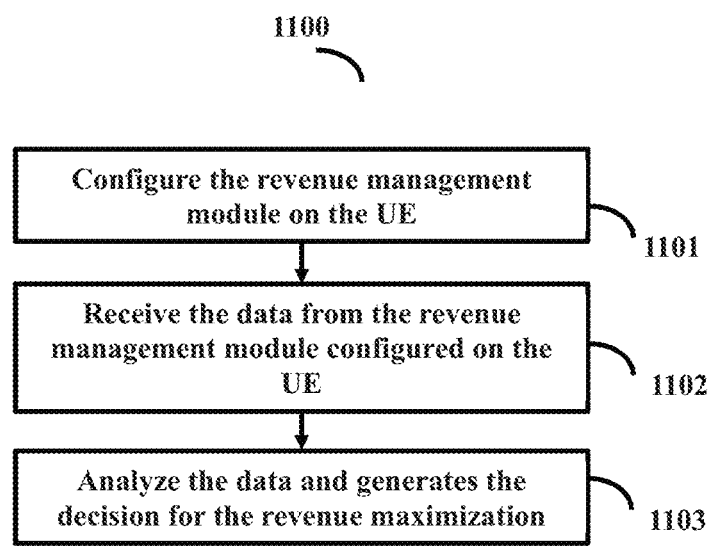
FIG. 11 is a flowchart illustrating a process of the network operator generating a decision for revenue maximization, according to embodiments as disclosed herein.

FIG. 11 is a flowchart illustrating a process of the network operator 106 generating the decision for the revenue maximization, according to embodiments as disclosed herein.

The network operator 106 configures (1101) the revenue management module 204c on the UE 102. The UE 102 may store the revenue management module 204c in the memory 204a of the UICC 204. Alternatively, the UE 102 may store the revenue management module 204c as an application in the memory 302.

The network operator 106 receives (1102) the data from the revenue management module 204c configured on the UE 102. The data may include at least one of, the information related to the network event, the profile of the UE 102, the one or more rules, the alert, and so on. The network operator analyzes (1103) the data and generates the decision for the revenue maximization. The decision may include at least one of, charging the subscriber for the specific network events for which the subscriber of the UE 102 fails to pay the bill, updating the charges of the subscriber, reversing the charges of the subscriber of the UE 102, and so on.

Embodiments disclosed herein enable the network operator to collect and profile usage information of a subscriber on the UE with the intention of using the information for revenue maximization applications, wherein the revenue maximization applications include but are not limited to fraud management, revenue assurance, churn management, customer experience management, credit risk management and partner settlement.

The embodiments disclosed herein can be implemented through at least one software program running on at least one hardware device and performing network management functions to control the network elements. The network elements shown in FIGS. 1, 2a, 2b, 3 and 4 include blocks which can be at least one of a hardware device, or a combination of hardware device and software module.

The embodiment disclosed herein specifies a system for revenue maximization in a communication network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A method for managing revenue from a subscriber of a communication network, the method comprising:
   determining, by a User Equipment (UE), at least one network event initiated to avail at least one service;
   preparing, by the UE, a profile of the UE, with respect to the at least one network event and sending, by the UE, the profile to a network operator;
   updating, by the UE, information related to the determined at least one network event in at least one register maintained for the at least one network event, wherein the at least one network event comprises a fraudulent event;
   fetching and sending, by the UE, the information related to the at least one network event from the at least one register to the network operator, wherein fetching and sending the information related to the at least one network event to the network operator includes:
   receiving at least one message including a specific key from the network operator, wherein the specific key includes a hash of an International Mobile Subscriber Identity (IMSI);
   fetching the information related to the network event stored in the at least one register, based on the received at least one message including the specific key; and
   sending the fetched information related to the network event to the network operator over the message; and
   generating, by the network operator, at least one decision for managing the revenue from the subscriber of the communication network based on the received information related to the at least one network event, wherein generating the at least one decision comprises parsing the received information and comparing the parsed information with billing records generated by the network operator for the UE.

2. The method of claim 1, wherein the network operator configures the UE with the at least one network event to determine, when the UE registers with the network operator.

3. The method of claim 1, wherein the information related to the determined network event includes at least one of, a number of calls initiated or received on the UE, a number of messages sent or received from the UE, a duration of each call, a type of each call, a frequency of visiting at least one Uniform Resource Locator (URL), and a frequency of using at least one application.

4. The method of claim 1, wherein the UE maintains a different register for each information of the at least one network event.

5. The method of claim 1, wherein fetching and sending the information related to the at least one network event to the network operator includes:
   checking a value of at least one counter associated with the at least one register that is maintained for the at least one network event with a pre-configured threshold, wherein the threshold is pre-configured by the network operator and the threshold indicates a count value;
   fetching the information related to the network event stored in the at least one register, if the value of the at least one counter associated with the at least one register satisfies the pre-configured threshold value; and
   sending the fetched information related to the network event to the network operator over a message, wherein the message includes a Short Messaging Service (SMS).

6. The method of claim 1, wherein the at least one decision generated by the network operator includes charging a subscriber of the UE for the at least one network event and updating a billing record of the subscriber of the UE.

7. The method of claim 1, further comprising:
checking, by the UE, if the determined at least one network event violates at least one rule;
performing, by the UE, at least one action if the determined at least one network event violates the at least one rule; and
enabling, by the UE, the network event to proceed, if the determined at least one network event does not violate the at least one rule.

8. The method of claim 7, wherein the at least one rule includes at least one of summarization rules, evaluation rules, and pattern matching rule.

9. The method of claim 7, wherein the at least one action includes one of:
sending data to the network operator using at least one of an Over The Air (OTA) interface, a data channel between the network operator and the UE, an encrypted SMS, and tone dialing for managing the revenue from the subscriber of the UE, wherein the data includes at least one of alerts, a profile of the UE, and the at least one rule; and
blocking the subscriber of the UE from availing the at least one service.

10. A communication network comprising:
a network operator; and
a User Equipment (UE) communicatively coupled to the network operator configured to:
determine at least one network event initiated to avail at least one service;
prepare a profile of the UE, with respect to the at least one network event and send the profile to the network operator;
update information related to the determined at least one network event in at least one register maintained for the at least one network event, wherein the at least one network event comprises a fraudulent event; and
fetch and send the information related to the at least one network event from the at least one register to a network operator, wherein the UE is further configured to:
receive at least one message including a specific key from the network operator, wherein the specific key includes a hash of an International Mobile Subscriber Identity (IMSI);
fetch the information related to the network event stored in the at least one register, based on the received at least one message including the specific key; and
send the fetched information related to the network event to the network operator over the message; and
wherein the network operator is configured to:
generate at least one decision for managing the revenue from the subscriber of the communication network based on the received information related to the at least one network event, wherein the network operator is configured to generate the at least one decision by parsing the received information and comparing the parsed information with billing records generated by the network operator for the UE.

11. The communication network of claim 10, wherein the network operator configures the UE with the at least one network event to determine, when the UE registers with the network operator.

12. The communication network of claim 10, wherein the information related to the determined network event includes at least one of, a number of calls initiated on the UE, a number of messages sent from the UE, a duration of each call, a type of each call, a frequency of visiting at least one Uniform Resource Locator (URL), and a frequency of using at least one application.

13. The communication network of claim 10, wherein the UE maintains a different register for each information of the at least one network event.

14. The communication network of claim 10, wherein the UE is further configured to:
check a value of at least one counter associated with the at least one register that is maintained for the at least one network event with a pre-configured threshold, wherein the threshold is pre-configured by the network operator and the threshold indicates a count value;
fetch the information related to the network event stored in the at least one register, if the value of the at least one counter associated with the at least one register satisfies the pre-configured threshold value; and
send the fetched information related to the network event to the network operator over a message, wherein the message includes a Short Messaging Service (SMS).

15. The communication network of claim 10, wherein the at least one decision generated by the network operator includes charging a subscriber of the UE for the at least one network event and updating a billing record of the subscriber of the UE.

16. The communication network of claim 10, wherein the UE is further configured to:
check if the determined at least one network event violates at least one rule;
perform at least one action if the determined at least one network event violates the at least one rule; and
enable the network event to proceed, if the determined at least one network event does not violate the at least one rule.

17. The communication network of claim 16, wherein the at least one rule includes at least one of summarization rules, evaluation rules, and pattern matching rule.

18. The communication network of claim 16, wherein the at least one action includes one of:
sending data to the network operator using at least one of an Over The Air (OTA) interface, a data channel between the network operator and the UE, an encrypted SMS, and tone dialing for managing the revenue from the subscriber of the UE, wherein the data includes at least one of alerts, a profile of the UE, and the at least one rule; and
blocking the subscriber of the UE from availing the at least one service.

19. A User Equipment (UE) comprising:
a memory; and
a controller coupled to the memory configured to:
determine at least one network event initiated to avail at least one service;
prepare a profile of the UE, with respect to the at least one network event and send the profile to a network operator;
update information related to the determined at least one network event in at least one register maintained for the at least one network event, wherein the at least one network event comprises a fraudulent event; and
fetch and send the information related to the at least one network event from the at least one register to a network operator for managing the revenue from the subscriber of the communication network, wherein the controller is further configured to:
  receive at least one message including a specific key from the network operator, wherein the specific key includes a hash of an International Mobile Subscriber Identity (IMSI);
  fetch the information related to the network event stored in the at least one register, based on the received at least one message including the specific key; and
  send the fetched information related to the network event to the network operator over the message;
wherein the network operator is configured to:
  generate at least one decision for managing the revenue from the subscriber of the communication network based on the received information related to the at least one network event, wherein the network operator is configured to generate the at least one decision by parsing the received information and comparing the parsed information with billing records generated by the network operator for the UE.

20. The UE of claim 19, wherein the controller includes a Universal Integrated Circuit Card.

21. The UE of claim 19, wherein the at least one network event to determine is configured on the UE by the network operator, when the UE registers with the network operator.

22. The UE of claim 19, wherein the information related to the determined network event includes at least one of, a number of calls initiated on the UE, a number of messages sent from the UE, a duration of each call, a type of each call, and a frequency of visiting at least one Uniform Resource Locator (URL).

23. The UE of claim 19, wherein the UE maintains a different register for each information of the at least one network event.

24. The UE of claim 19, wherein the controller is further configured to:
  check a value of at least one counter associated with the at least one register that is maintained for the at least one network event with a pre-configured threshold, wherein the threshold is pre-configured by the network operator and the threshold indicates a count value;
  fetch the information related to the network event stored in the at least one register, if the value of the at least one counter associated with the at least one register satisfies the pre-configured threshold value; and
  send the fetched information related to the network event to the network operator over a message, wherein the message includes a Short Messaging Service (SMS).

25. The UE of claim 19, wherein the UE is further configured to:
  check if the determined at least one network event violates at least one rule;
  perform at least one action if the determined at least one network event violates the at least one rule; and
  enable the network event to proceed, if the determined at least one network event does not violate the at least one rule.

26. The UE of claim 25, wherein the at least one rule includes at least one of summarization rules, evaluation rules, and pattern matching rule.

27. The UE of claim 25, wherein the at least one action includes one of:
  sending data to the network operator using at least one of an Over The Air (OTA) interface, a data channel between the network operator and the UE, an encrypted SMS, and tone dialing for managing the revenue from the subscriber of the UE, wherein the data includes at least one of alerts, a profile of the UE, and the at least one rule; and
  blocking the subscriber of the UE from availing the at least one service.

* * * * *